United States Patent

Harman, Jr. et al.

[11] Patent Number: 5,951,026
[45] Date of Patent: Sep. 14, 1999

[54] REMOVABLE CHUCK

[75] Inventors: William G. Harman, Jr., Glen Rock, Pa.; Dale K. Wheeler, Fallston; William J. Spangler, Jr., Belair, both of Md.; Robert H. Gifford, New Freedom, Pa.

[73] Assignee: Black & Decker Inc., Newark, Del.

[21] Appl. No.: 08/989,715

[22] Filed: Dec. 12, 1997

[51] Int. Cl.⁶ ..................................................... B23B 5/22
[52] U.S. Cl. .................. 279/143; 7/158; 7/165; 279/75; 279/145; 408/239 R
[58] Field of Search ..................................... 279/143, 145, 279/75; 408/239 R; 7/158, 165

[56] References Cited

U.S. PATENT DOCUMENTS

| | | |
|---|---|---|
| 868,812 | 10/1907 | Ruegg . |
| 870,034 | 11/1907 | Hopkins . |
| 949,439 | 2/1910 | Rhyne . |
| 970,670 | 9/1910 | Wahlstrom . |
| 1,309,815 | 7/1919 | Schinkez . |
| 1,312,298 | 8/1919 | Bileck . |
| 1,484,379 | 2/1924 | Rainey . |
| 1,826,038 | 10/1931 | Altenbach . |
| 1,896,645 | 2/1933 | Pfauser . |
| 2,618,940 | 11/1952 | Wyzenbeek . |
| 2,620,210 | 12/1952 | Wüster . |
| 2,639,158 | 5/1953 | Procos . |
| 2,682,414 | 6/1954 | Richardson . |
| 3,116,068 | 12/1963 | Pfister et al. . |
| 3,484,114 | 12/1969 | Rodin ........................................... 279/1 |
| 3,929,343 | 12/1975 | Wanner et al. . |
| 3,932,904 | 1/1976 | Nilsson et al. . |
| 4,131,165 | 12/1978 | Wanner et al. . |
| 4,174,113 | 11/1979 | Eckman . |
| 4,184,692 | 1/1980 | Benson et al. . |
| 4,188,041 | 2/1980 | Soderberg . |
| 4,209,182 | 6/1980 | Sheldon . |
| 4,224,969 | 9/1980 | Plessner . |
| 4,234,277 | 11/1980 | Benson et al. . |
| 4,309,042 | 1/1982 | Fauth et al. . |

(List continued on next page.)

FOREIGN PATENT DOCUMENTS

| | | |
|---|---|---|
| 92/21469 | 12/1992 | Australia ................................ 279/143 |
| 465229 | 5/1950 | Canada . |
| 0 175 088 B1 | 3/1986 | European Pat. Off. . |
| 0 265 380 A2 | 4/1988 | European Pat. Off. . |
| 2249234 | 4/1974 | Germany . |
| 7540286 U | 9/1976 | Germany . |
| 3336549 A1 | 4/1984 | Germany . |
| 3412913 A1 | 10/1984 | Germany . |
| 3338060 C2 | 11/1985 | Germany . |
| 3507684 A1 | 9/1986 | Germany . |
| 9215412 U | 2/1993 | Germany . |
| 4203158 A1 | 8/1993 | Germany . |
| 9203627 U | 9/1993 | Germany . |
| 56-152545 | 11/1981 | Japan . |
| 86413 | 12/1919 | Switzerland . |
| WO 92/21469 | 12/1992 | WIPO . |

*Primary Examiner*—Andrea L. Pitts
*Assistant Examiner*—Monica Smith
*Attorney, Agent, or Firm*—Harness, Dickey & Pierce, P.L.C.

[57] ABSTRACT

A removable chuck has a chuck member for holding a drill bit. Also, a mechanism is coupled with the chuck body to retain the chuck body to a drill spindle. The retention mechanism, in a first position, retains the chuck on the drill spindle and in a second position the release mechanism enables the chuck to be removed from the spindle.

35 Claims, 7 Drawing Sheets

U.S. PATENT DOCUMENTS

| | | |
|---|---|---|
| 4,390,311 | 6/1983 | Kuhlmann . |
| 4,395,051 | 7/1983 | Tonomura . |
| 4,434,859 | 3/1984 | Rumpp et al. . |
| 4,456,412 | 6/1984 | Ford et al. . |
| 4,491,443 | 1/1985 | DeCaro . |
| 4,491,444 | 1/1985 | Rumpp et al. . |
| 4,491,445 | 1/1985 | Hunger et al. . |
| 4,502,824 | 3/1985 | Dohse et al. . |
| 4,514,117 | 4/1985 | Scott . |
| 4,536,113 | 8/1985 | Hatfield . |
| 4,550,476 | 11/1985 | DeCaro . |
| 4,588,335 | 5/1986 | Pearson, Jr. . |
| 4,592,560 | 6/1986 | Neumaier et al. . |
| 4,621,820 | 11/1986 | Röhm . |
| 4,629,375 | 12/1986 | Lieser . |
| 4,645,368 | 2/1987 | Simpson et al. . |
| 4,651,600 | 3/1987 | Zettl . |
| 4,691,929 | 9/1987 | Neumaier et al. . |
| 4,692,073 | 9/1987 | Martindell . |
| 4,701,083 | 10/1987 | Deutschenbaur et al. . |
| 4,767,246 | 8/1988 | Camloh et al. . |
| 4,775,269 | 10/1988 | Brix . |
| 4,818,157 | 4/1989 | Kouvelis . |
| 4,824,298 | 4/1989 | Lippacher et al. . |
| 4,863,323 | 9/1989 | Glaser . |
| 4,878,679 | 11/1989 | Plank et al. . |
| 4,900,202 | 2/1990 | Wienhold . |
| 4,906,147 | 3/1990 | Friesinger et al. . |
| 4,958,840 | 9/1990 | Palm . |
| 4,968,191 | 11/1990 | Palm . |
| 5,000,631 | 3/1991 | Deutschenbaur et al. . |
| 5,009,440 | 4/1991 | Manschitz . |
| 5,110,145 | 5/1992 | Stewart . |
| 5,129,118 | 7/1992 | Walmesley ............................. 279/145 |
| 5,167,478 | 12/1992 | Ramunas . |
| 5,171,030 | 12/1992 | Röhm . |
| 5,174,694 | 12/1992 | Voellmer . |
| 5,174,696 | 12/1992 | Bogner . |
| 5,180,261 | 1/1993 | Schreiber . |
| 5,199,833 | 4/1993 | Fehrle et al. . |
| 5,211,693 | 5/1993 | Pacher . |
| 5,255,993 | 10/1993 | Kovacs . |
| 5,265,988 | 11/1993 | Schmigalla et al. . |
| 5,279,194 | 1/1994 | Armbrust ................................. 279/75 |
| 5,330,206 | 7/1994 | Krumszyn et al. . |
| 5,342,154 | 8/1994 | Holzer . |
| 5,381,707 | 1/1995 | Gill . |
| 5,398,946 | 3/1995 | Quiring . |
| 5,417,527 | 5/1995 | Wienhold . |
| 5,437,465 | 8/1995 | Vogele et al. ........................... 279/905 |
| 5,437,524 | 8/1995 | Huang . |
| 5,466,101 | 11/1995 | Meyen . |
| 5,470,084 | 11/1995 | Reibetanz et al. . |
| 5,573,358 | 11/1996 | Gobbers et al. . |
| 5,580,197 | 12/1996 | Röhm . |
| 5,586,847 | 12/1996 | Mattern, Jr. et al. . |
| 5,590,985 | 1/1997 | Mack . |
| 5,603,516 | 2/1997 | Neumaier . |
| 5,651,647 | 7/1997 | Ray ......................................... 279/145 |

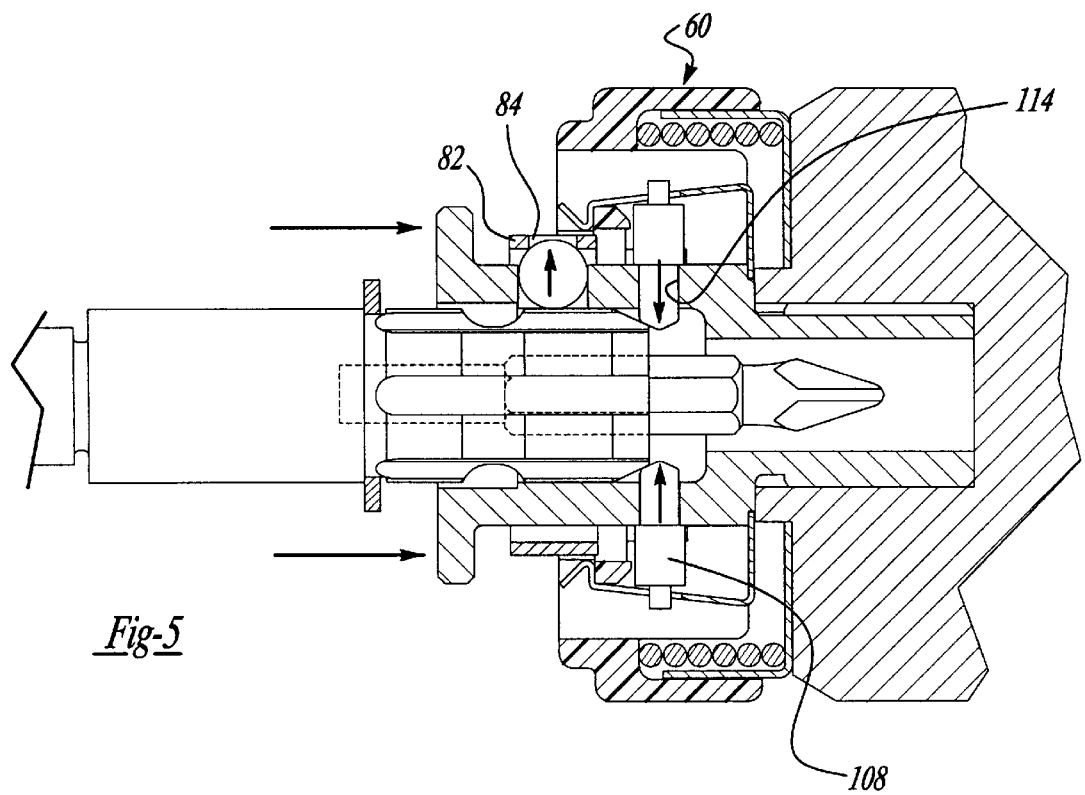
Fig-5
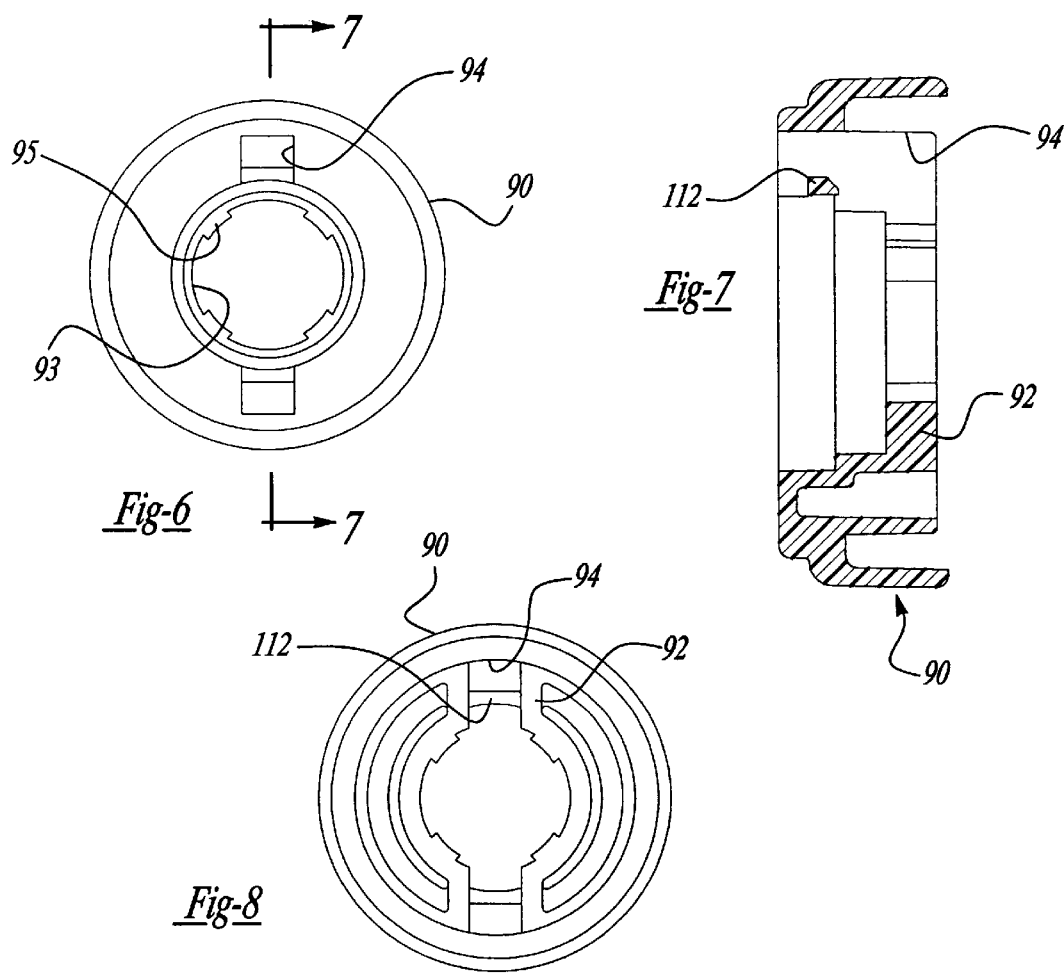
Fig-6
Fig-7
Fig-8

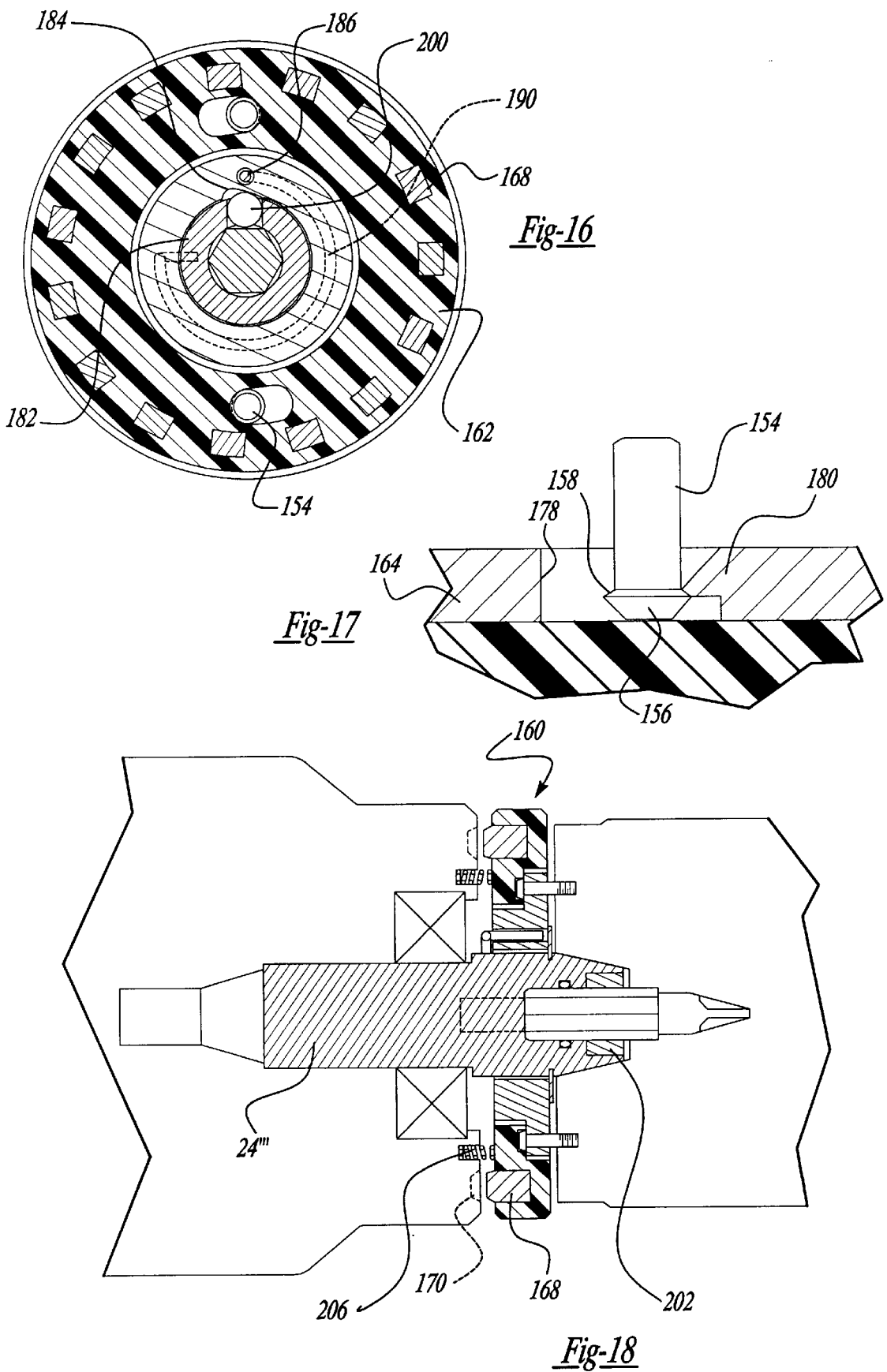

REMOVABLE CHUCK

FIELD OF THE INVENTION

The invention relates to rotatable tools such as drills, hammer drill, screwdrivers, and other power tools. More particularly, the present invention relates to a removable chuck for a hand-held tool.

BACKGROUND OF THE INVENTION

In the consumer market, it is desirable to use rotatable tools with a drill bit to form holes in a workpiece. Also, it is desirous to insert fasteners, such as screws with a regular or Phillips, head into these holes to retain multiple workpieces together. Ordinarily, one uses the tool to drill the holes in the workpiece. After drilling the holes in the workpiece, the drill bit is removed from the chuck and a tool bit is inserted into the chuck for driving the fastener. While this has been an effective method for driving fasteners into the workpiece, it is burdensome and time consuming to continually drill holes remove the drill bit from the chuck and insert a tool bit to drive the fastener. Generally, this process is continued while connecting several workpieces together. Further, this process has been carried out in the professional power tool devices. Thus, it would be desirable to provide a chuck with the drill bit, which is removable from the tool to expose a spindle, with a tool bit, on the tool to drive the fasteners.

SUMMARY OF THE INVENTION

Accordingly, it is an object of the present invention to provide a removable chuck assembly embodying the foregoing design objectives.

In accordance with one aspect of the invention, a removable chuck comprises a sleeve adapted to connect with a rotating spindle. A chuck body is coupled with the sleeve. A locking mechanism is adapted to retain the sleeve on the rotating spindle. The locking mechanism has a locking member which seats in a recess in the spindle. A first biasing member holds the locking member in the recess to prohibit removal of the chuck. The biasing member is movable from a first position, where a force is applied on the locking member to hold the locking member in the spindle recess, to a second position where the locking member is out of the spindle recess applying a force on the first biasing member. A locking sleeve surrounds the biasing member. The locking sleeve, in a first position, prohibits expansion of the first biasing member which, in turn, prohibits removal of the locking member from the spindle recess. In a second position, the locking sleeve enables the first biasing member to expand which, in turn, enables removal of the sleeve from the spindle. Further, a mechanism maintains the locking sleeve in the second position to enable the sleeve to be readily replaced onto the spindle. The maintaining mechanism has a biasing member surrounding the sleeve. At least one pin is coupled with the biasing member and is in an aperture in the sleeve in contact with the spindle. A latch is coupled with the locking sleeve. In the locking sleeve first position, the pin is on the spindle. In the locking sleeve second position, when the chuck is being removed from the spindle, the pin moves further into the opening in turn latching the biasing member with the latch to maintain the locking sleeve in the second position. Upon replacing the sleeve onto the spindle, the pin returns into the sleeve opening, releasing the biasing member from the latch to enable the locking sleeve to return to its first position.

In accordance with a second aspect of the invention, a hand tool comprises a hand tool with a rotatable spindle. The spindle includes a recess. A removable chuck is coupled with the spindle. A sleeve couples the removable chuck with the rotatable spindle. A locking mechanism retains the sleeve on the rotating spindle. The locking mechanism has a locking member which seats in the spindle recess. A first biasing member holds the locking member in the recess. The biasing member is movable from a first position, where a force is applied on the locking member to hold the locking member in the spindle recess, to a second position, where the locking member is out of the spindle recess applying a force on the first biasing member. A locking sleeve surrounds the biasing member. The locking sleeve, in a first position, prohibits expansion of the first biasing member which, in turn, prohibits removal of the locking member from the spindle recess. In a second position, the locking sleeve enables the first biasing member to expand which, in turn, enables removal of the sleeve from the spindle. Further, a mechanism maintains the locking sleeve in the second position to enable the sleeve to be readily replaced onto the spindle. The maintaining mechanism has a biasing member surrounding the sleeve. At least one pin is coupled with the biasing member and is in an aperture in the sleeve in contact with the spindle. A latch is coupled with the locking sleeve. In the locking sleeve first position, the pin is on the spindle. In the locking sleeve second position, when the chuck is being removed from the spindle, the pin moves further into the opening in turn latching the biasing member with the latch to maintain the locking sleeve in the second position. Upon replacing the sleeve onto the spindle, the pin returns into the sleeve opening, releasing the biasing member from the latch to enable the locking sleeve to return to its first position.

In accordance with a third aspect of the invention, a removable chuck comprises a chuck member with a retention member projecting from the chuck member. A release member is adapted to couple with a spindle. The release member includes a member for locking the retention member with the release member. The retention member is a stud projecting from a rear surface of the chuck. The locking member has an opening to retain the stud. The locking member includes a flange which couples with the stud to retain the stud in the release member. The release member is rotatable between the first position and the second position to release the stud from the locking member.

In accordance with a fourth aspect of the invention, a hand tool comprises a hand tool having a rotatable spindle and a removable chuck. The removable chuck comprises a chuck member with a retention member projecting from the chuck member. A release member is adapted to couple with the spindle. The release member includes a member for locking the retention member with the release member. The retention member is a stud projecting from a rear surface of the chuck. The locking member has an opening to retain the stud. The locking member includes a flange which couples with the stud to retain the stud in the release member. The release member is rotatable between the first position and the second position to release the stud from the locking member and a retaining member secures the release member on the spindle. Also, the spindle has an aperture to receive a tool bit. Further, a second aperture is in the spindle to receive a locking member.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate the present invention and together with the description serve to explain the principles of the invention. In the drawings, the same reference numerals indicate the same parts.

FIG. 5 is a cross-section view like that of FIG. 3 in a removable position.

FIG. 6 is a front plan view of the locking sleeve.

FIG. 7 is a cross-section view of FIG. 6 along line 7—7 thereof.

FIG. 8 is a rear plan view of the locking sleeve.

FIG. 16 is a plan view of the release mechanism.

FIG. 17 is a cross-section view of FIG. 16 along line 17—17 thereof.

FIG. 18 is a cross-section view like that of FIG. 15 illustrating an alternate embodiment of the spindle.

DETAILED DESCRIPTION OF THE PREFERRED EMBODIMENT

Figure 1:
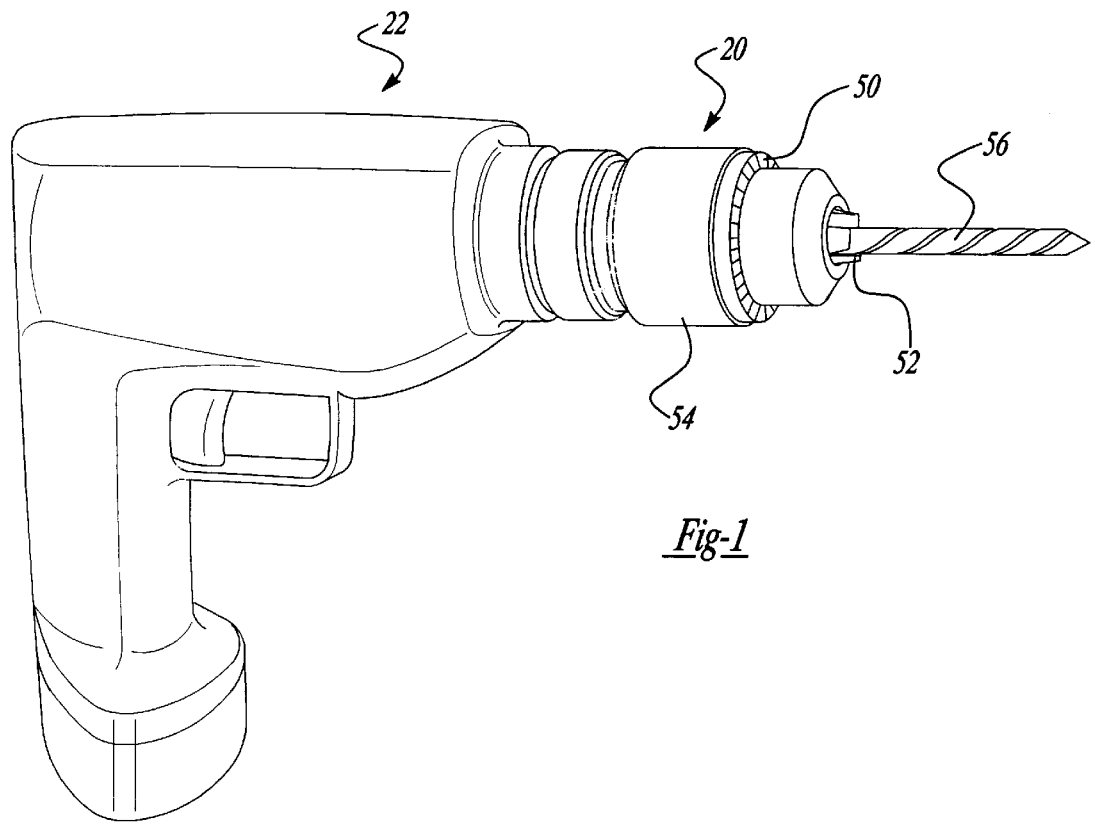
FIG. 1 is a perspective view of a tool with the removable chuck of the present invention.
Figure 2:
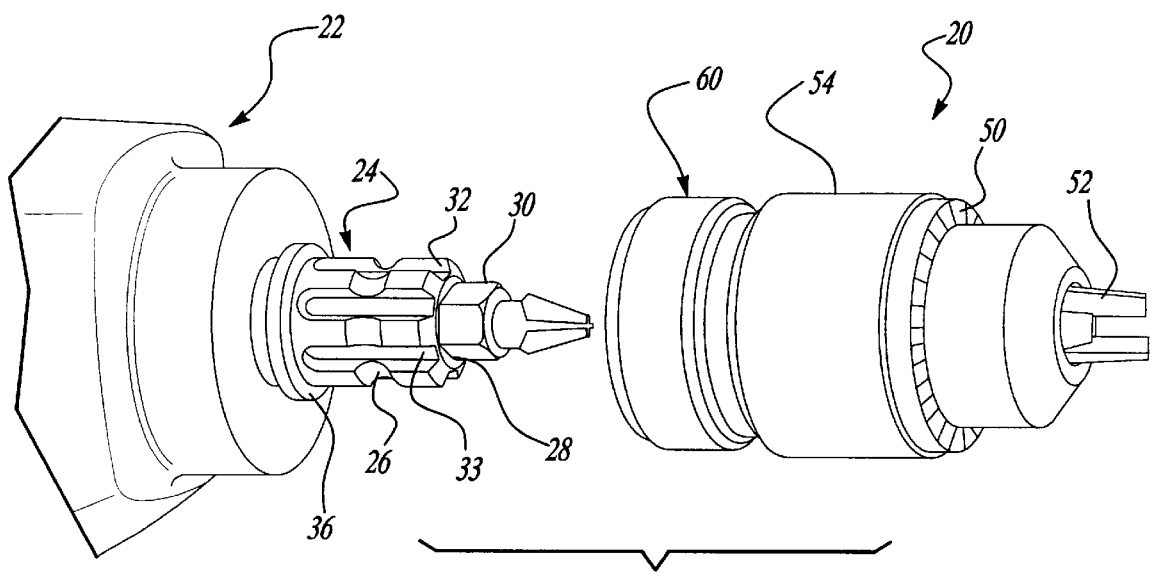
FIG. 2 is a perspective view of FIG. 1 with the chuck removed from the spindle.

Turning to the figures, particularly FIGS. 1–12, a removable chuck 20 is illustrated on a tool 22. In this particular embodiment, the tool 22 is a rotary drill, however a hammer drill or power screwdriver would work equally well. The drill 22 includes a spindle 24 which, in turn, includes an aperture 28 to receive a tool bit 30. The spindle 24 includes a circumferential groove 26 as well as a plurality of raised members 32 separated by axial channels 33. Also, a retaining ring 36 is received in a notch 40 in the spindle to prohibit additional forward movement of the chuck 20 onto the spindle 24. A magnet 38 is positioned in the spindle 24 to magnetize the tool bit 30 as well as to retain the tool bit in the bore. Likewise, the raised members 32 and channels 33 provide the drive connection with the chuck 20.

The chuck 20 includes a body 50, jaw members 52 with a locking sleeve 54, which are conventional, to retain a drill bit 56 within the chuck 20. A retaining mechanism 60 is at the rear of the chuck body 50 to enable the chuck 20 to be secured with and removed from the spindle 24.

The retention mechanism 60 includes a drive sleeve or spud 62. The spud 62 (best seen in FIGS. 9–12) has a first tubular portion 64 which may have splines or the like 66 which are press-fit into an aperture 68 in the rear of the chuck body 50 to secure the spud 62 with the chuck body 50. The second tubular portion 70 of the spud has bore 72 with corresponding raised members 74 and axial channels 75 to mate with the spindle 24. Channels 77 are formed on the exterior surface of the second tubular portion to enable axial non-rotatable movement of the sleeve 90 with respect to the spud 62.

Figure 3:
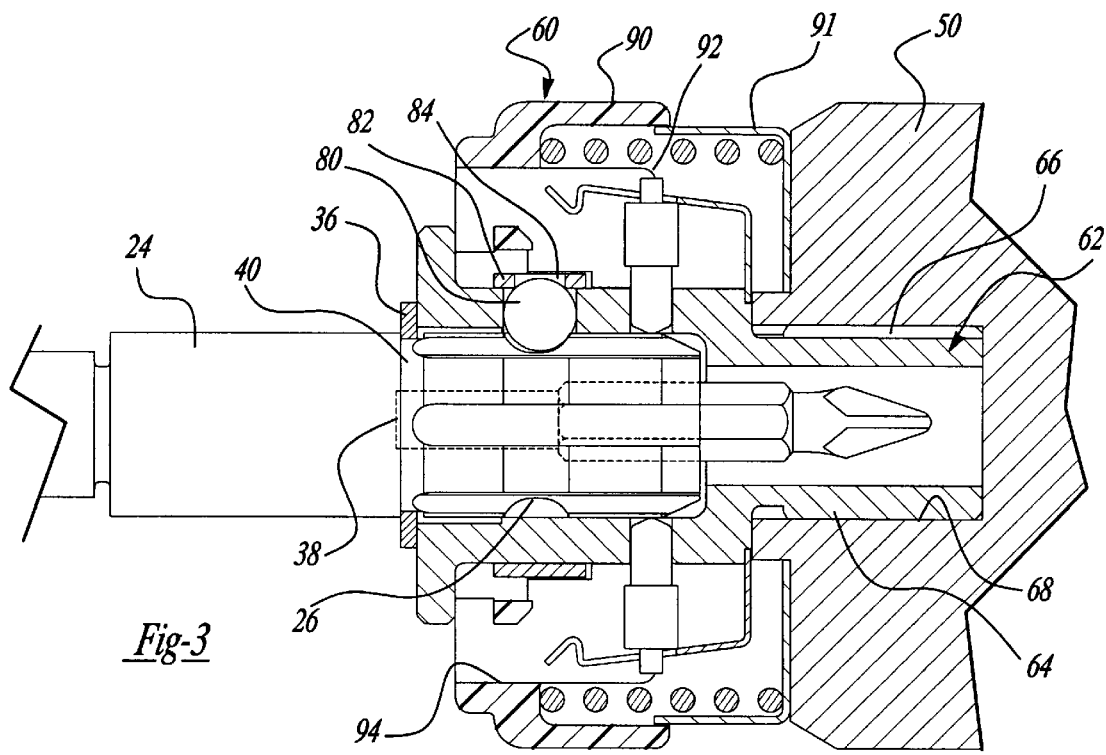
FIG. 3 is a cross-section view of FIG. 1 along line 3—3 thereof.
Figure 4:
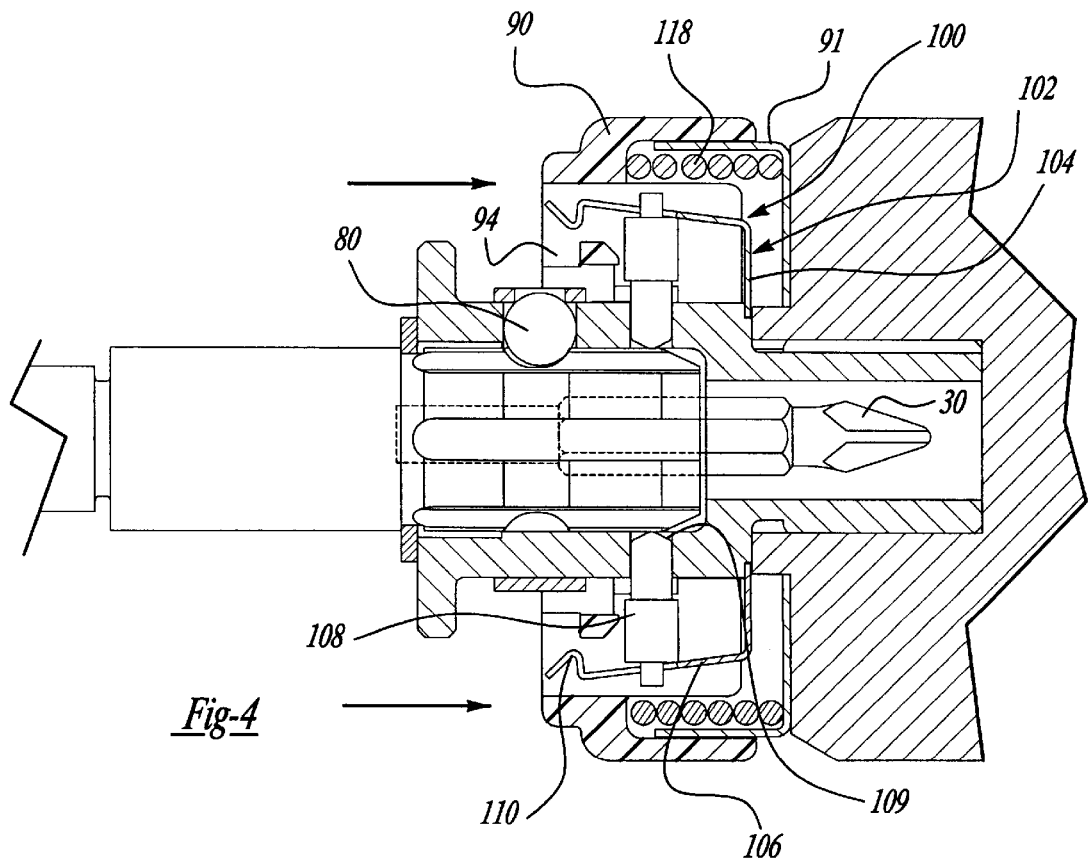
FIG. 4 is a view like that of FIG. 3 during an intermediate removal step of the chuck.
Figure 9:
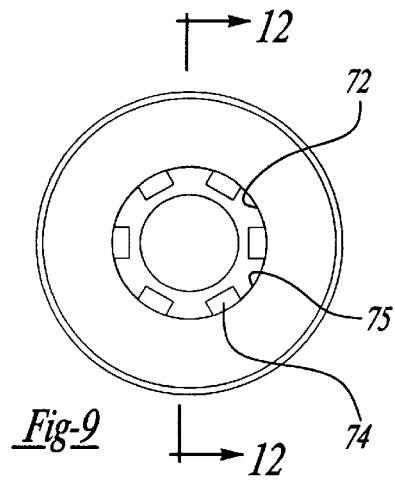
FIG. 9 is a front plan view of the spud.
Figure 10:
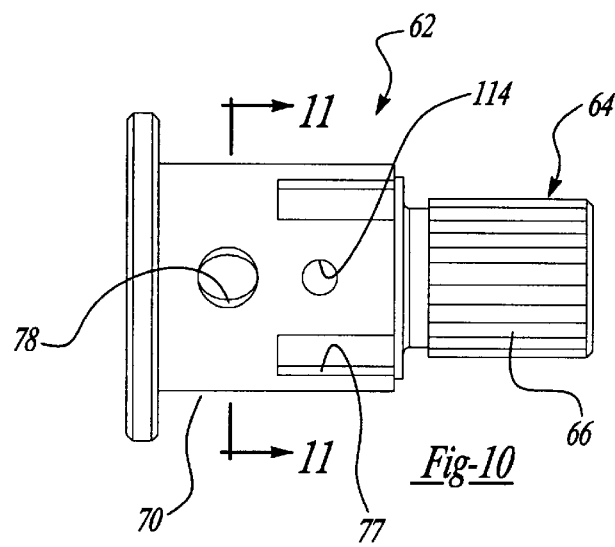
FIG. 10 is a side plan view of the spud.
Figure 11:
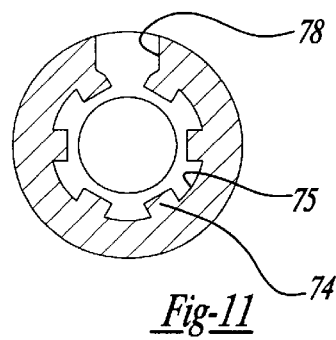
FIG. 11 is a cross-section view of FIG. 10 along line 11—11 thereof.
Figure 12:
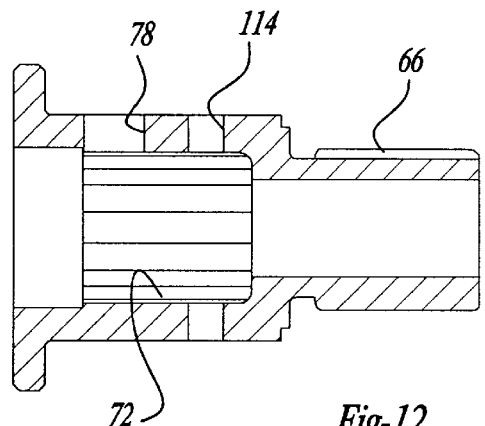
FIG. 12 is a cross-section view of FIG. 9 along line 12—12 thereof.

The spud second portion 70 includes an aperture 78 which receives a detent locking ball 80. The locking ball 80 seats in the spindle groove 26. A first biasing spring ring 82 is positioned about the exterior of the drive spud second portion 70. The spring ring 82 is circular with a gap between the ends and has an aperture 84 which is positioned on top of the detent ball 80. The spring ring 82 is in a constricted position retaining the ball 80 within the groove 26 as illustrated in FIGS. 3 and 4. The spring ring 82 radially expands to a second position as illustrated in FIG. 5 when the retention mechanism 60 is in a release or second position which enables the chuck 20 to be pulled off the spindle 24. To accomplish this, the detent ball 80 is moved from the groove 26 to apply a force onto the spring ring 82. The force expands the spring ring 82 as the detent ball 80 rolls out of the recess 26 which, in turn, enables removal of the chuck.

The retention mechanism 60 also includes a first and second sleeve 90 and 91. The first sleeve 90 (best seen in FIGS. 6–8) includes an inner boss 92 which defines a central bore 93 that surrounds the spring ring 82 to prohibit expansion of the spring ring 82 when the first sleeve 90 is in a first or retaining position as illustrated in FIG. 3. The boss 92 has a pair of openings 94 which enables a latching mechanism 100 to project through the boss 92. The latching mechanism 100 maintains the first sleeve 90 in its second position once the chuck is removed from the spindle. With the first sleeve 90 maintained in its second position, it easily enables the chuck 20 to be positioned back onto the spindle 24 after removal. The central bore 93 is stepped and has projections 95 which are received in spud channels 77. This meshing of the projections 95 with the channels 77 prohibits rotational movement of the locking sleeve 90 and enables axial movement of the sleeve 90. This prohibits rotation which would dislodge the retention mechanism from its position and function.

The latch mechanism 100 includes a latching spring 102 which has a circular collar 104. The collar 104 is fixed between the spud 62 and rear of the chuck when the spud 62 is press-fit into the chuck body 50. Two fingers 106 extend into the pair of boss openings 94. Latch pins 108 are secured in an opening of the split fingers 106. The pins 108 enable the locking sleeve to be retained in a second position. The pins 108 have conical ends 109 which enable the pins to ride upon the tapered spindle end when the chuck is returned onto the spindle. The fingers 106 include angled feet 110 which contact a ring portion 112 within the boss apertures 94.

The pins 108 extend through bores 114 in the second tubular portion 70 of the spud 62. The pins 108 ride or slide on the spindle 24 in a locked position as illustrated in FIG. 3. As the chuck 20 is removed from the spindle 24, the pins 108 move inward into the bore 114 of the spud 62 which, in turn, enable the angled feet 110 to be latched with the inner ring 112. Thus, this maintains the locking sleeve 90 in its second or released position. If the fingers 106 become released from ring portions 112 when the chuck is removed from the spindle 24, the angled feet 110 enable the fingers to lift up, grasping the ring portions 112 and returning the first sleeve 90 to its second position.

A coil spring 118 is positioned between the first and second sleeves 90, 91 to return the first sleeve 90 to its first position after the chuck 20 is returned to the spindle 24. Also, the spring 118 maintains the second sleeve 91 on the spud. When the pins 108 contact the spindle 24, the pins 108 move outwardly which, in turn, releases the angled feet 110 from the portion 112 to enable the first sleeve 90 to return to its first position. Also, the coil spring 118 maintains the first sleeve 90 in its first position to maintain the detent ball 80 within the recess 26 and the boss 92 covering the spring ring 82.

To actuate the first sleeve 90, to remove the chuck 20 from the spindle 24, the first sleeve 90 is moved from the first position illustrated in FIG. 3 axially, to a telescoping position over second sleeve 91 as shown in FIG. 4. As the first sleeve 90 moves axially, the boss 92 uncovers the spring ring 82. As the drive spud 62 is moved away from the retaining ring 38, the detent ball 80 begins to roll out of the groove 26 and apply a force onto the spring ring 82 which expands the spring ring and in turn enables the detent ball 80 to be removed from the spindle groove 26. As this occurs, the chuck can then be removed from the spindle as illustrated in FIG. 5.

Figure 13:
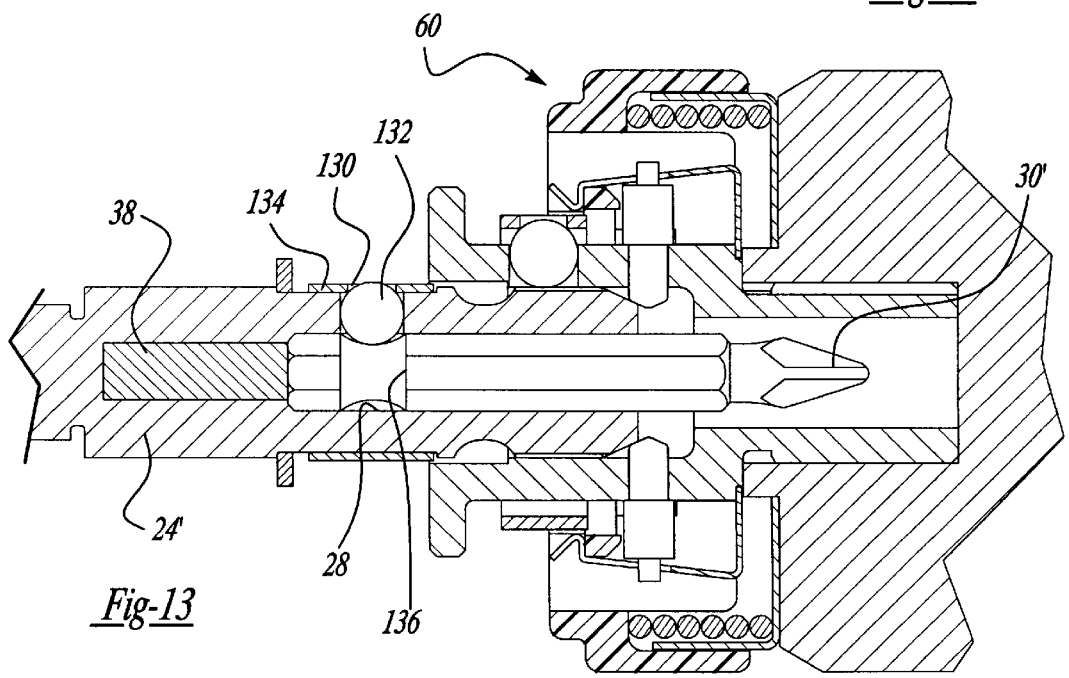
FIG. 13 is a cross-section view like FIG. 3 of an alternate embodiment of the spindle.
Figure 14:
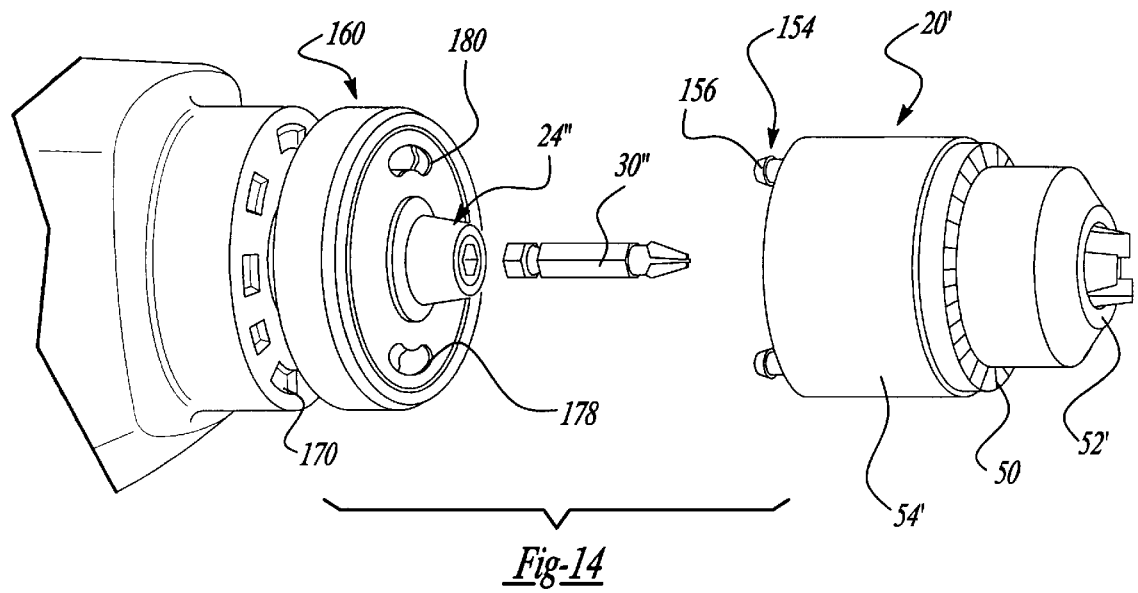
FIG. 14 is a perspective view of a second embodiment with the removable chuck removed from the spindle in accordance with the present invention.
Figure 15:
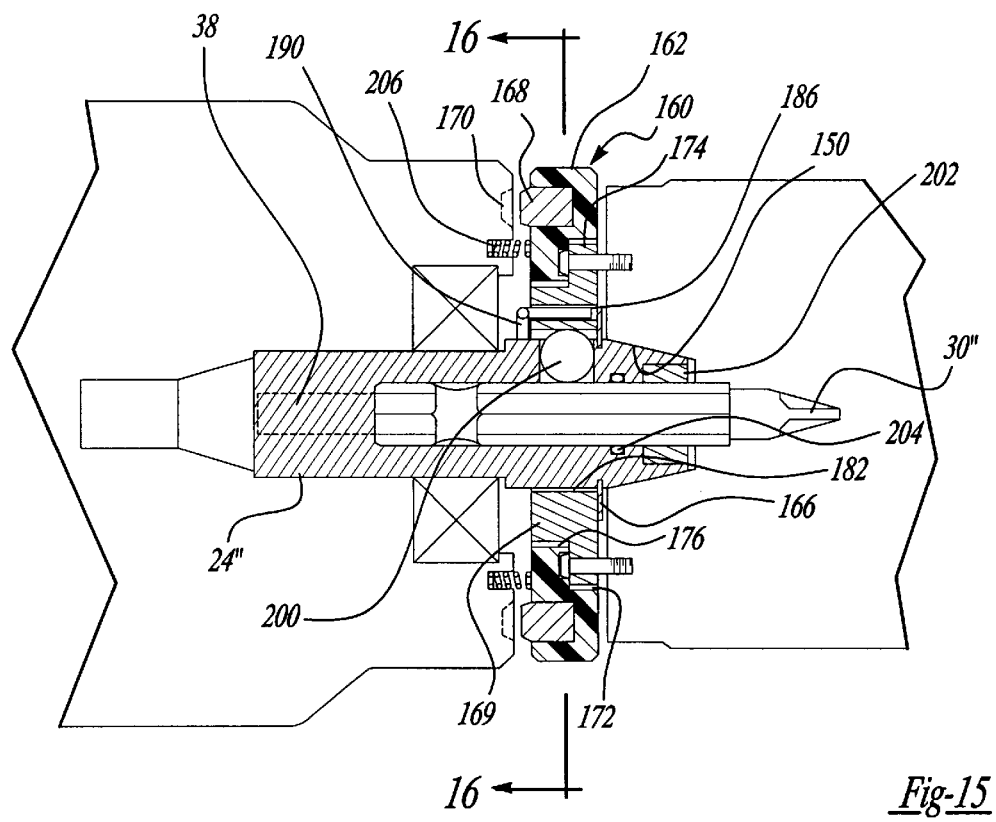
FIG. 15 is a cross-section view of FIG. 7 with the chuck connected with the tool.

Turning to FIG. 13, an additional embodiment of the tool is shown. Here, the removable chuck is the same as disclosed above. However, the spindle is different. The spindle 24' includes a deeper central bore 28' and a transverse aperture 130. A detent ball 132 is positioned in the aperture 130 and is held in the aperture by a spring ring 134, like spring ring 82. Here, the spud 62 is positioned over the ball 132 when the chuck 20 is positioned onto the spindle 24'. After the chuck 20 has been removed from the spindle 24', the tool bit 30' with its circumferential recess 136 may be withdrawn from the spindle 24' by initiating a pull-out force on the tool bit 30' which, in turn, pushes the detent ball 132 against the spring ring 134 to expand the spring ring 134 to enable the tool bit 30' to be removed from the spindle 24'.

Turning to FIGS. 14–18, another embodiment of the present invention is shown. The elements which are the same are identified by the same reference numerals.

A removable chuck 20' is illustrated and includes a chuck body 50', jaws 52', and lock ring 54'. The rear of the chuck body 50' includes a tapered bore 150 to receive the spindle 24". The bore 150 may have a cross-section configuration corresponding to the spindle, as described above, to aid in rotating the chuck 20'. Also, the chuck body 50' includes at least one projecting stud 154 which includes a head 156. Here, two studs 154 are shown.

A release member 160 is maintained on the spindle 24'. The release member 160 includes a plastic outer disc 162 and a press metal inner disc 164 press fit into the outer disc 162. The disc members 162 and 164 are maintained on the spindle 24" by a retention ring 166. The release member 162 has projecting members 168 for coupling with recess 170 on the housing as will be explained herein.

The disc 162 includes an annular recess 172 to receive a portion 174 of the disc 164. Also, the disc 162 includes a central opening 176 to receive the disc 164.

The disc 164 includes at least one oblong cut-out 178 to receive the head 156 of the stud 154. Also, a flange 180 is at one end of the oblong shape cut-out 178. The head 156 of the stud 154 inserts behind the flange 180 to retain the stud and in turn the chuck 20' with the release mechanism 160 (See FIG. 17). The head 156 has an angled rear surface 158 which serves to draw the chuck bore 150 in better contact with the tapered spindle head.

The disc 164 includes a central opening 182 which includes a cut-out portion 184. The opening enables the spindle 24" to pass through the disc 164. Also, the disc 164 includes an aperture 186 to receive an end of a torsion spring 190 which is positioned about the spindle 24". The spring 190 biases the rotatable release mechanism 160 between a first and second position. In turn, the torsion spring 190 returns the release member back to its first position. The other end of the torsion spring is positioned into a bore in the spindle.

The cut-out 184 in the disc member 164 receives a detent ball 200 in the spindle 24" The ball 200 enables removal of the tool bit 30" from the spindle 24".

The spindle 24" includes a collar 202 press-fit into the end of the spindle 24". The collar 202 is generally a press metal part having a circular exterior and a hexagonal cross-sectional interior bore. The bore receives the tool bit 30". Also, a rubber or steel friction ring 204 having a C-shape is positioned in the bore of the spindle. The friction ring 204 serves to minimize nuisance movement of the screwdriver bit 30" forward with chuck removal. The detent ball 200 rides on a flat portion of the tool bit 30". If the tool bit 30" would be withdrawn forwardly from the spindle, the ball 200 would eventually catch the circumferential groove of the tool bit 30", prohibiting further forward movement of the tool bit.

The projecting members 168 which extend from the release member 160 mate with the recesses 170 in the housing for an active spindle lock. To activate the spindle lock, the release member is grasped and moved backward against springs 206 until the projecting members 168 insert in the recess 170. As this occurs, the spindle rotation ceases and an effective spindle lock is provided. When the release mechanism 160 is released, the springs 206 push it forward, releasing the spindle lock, enabling rotation of the spindle.

Turning to FIG. 18, an additional embodiment of the spindle 24''' is shown. Here, the differences relate to the spindle central bore and the detent ball has been removed. The disc 164' does not include the cut-out portion and thus rotates around the spindle. Also, the tool bit may be removed from the bore within the spindle.

Figure 19:
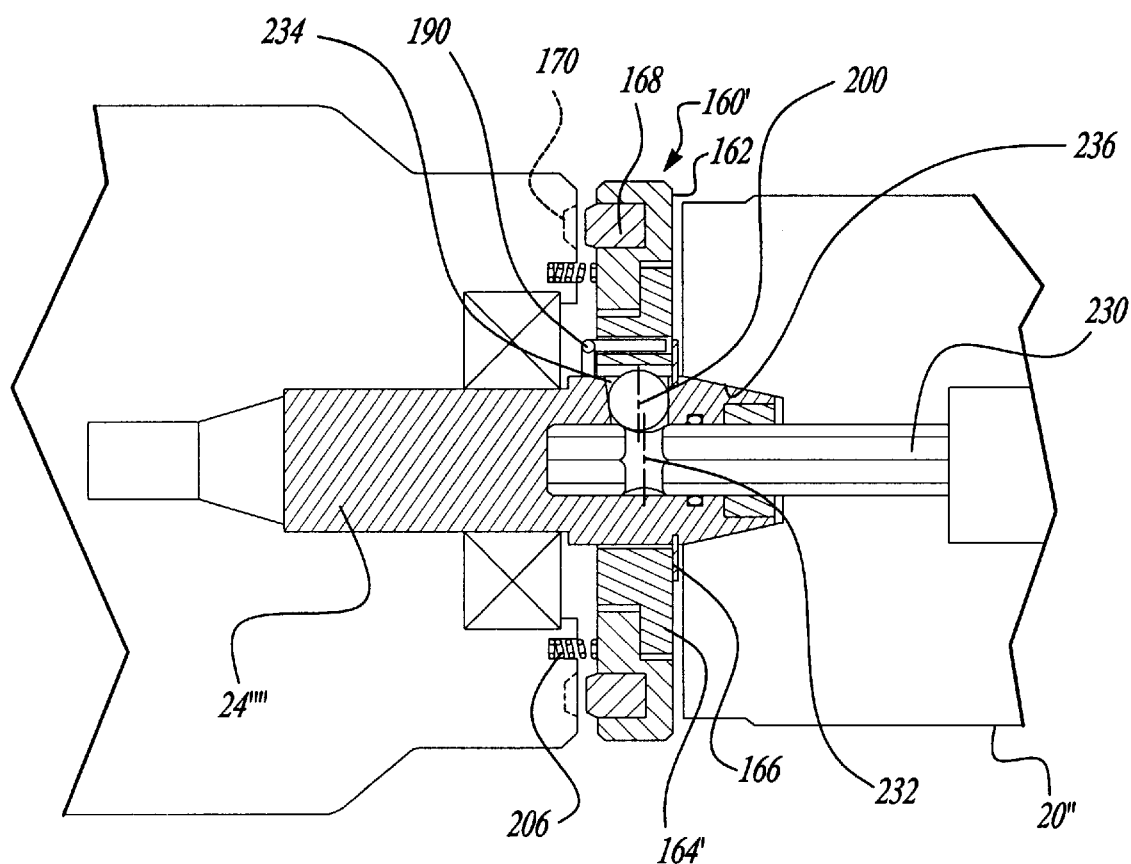
FIG. 19 is a cross-section view like that of FIG. 15 illustrating an alternative embodiment.

FIG. 19 is an additional embodiment of the present invention. FIG. 19 is similar to FIG. 15; however, the posts, as well as the apertures in the release member, are not present. Here, a hexagonal shaft 230 is secured with the chuck 20" by being press fit or the like into a bore in the chuck 20. Also, a circumferential groove 232 in the shaft 230 is in contact with the ball 200 to retain the chuck 20" on the spindle 24''''. The remainder of the release mechanism 160' is the same as that previously discussed. Upon rotation of the release mechanism 160', the ball 200 moves into cut-out 184, enabling the shaft to be removed from the spindle 24''''. Also, the spindle bore 234, which the ball 200 is retained in, is angled with respect to vertical to prohibit the ball from passing through the spindle bore 234. The ball 200 exerts a rearward force on the shaft 230 to enhance the conical contact between the spindle head and the chuck conical bore 236 so that wobble does not occur in a no load condition.

The force is created by the undercut groove 232 on shaft 230 being positioned with respect to spindle 24'''' such that the center of the groove 232 is to the right of the center of the bore 234. Thus, the ball 200 is in contact with the left side of the groove 232 exerting the rearward force.

While the above detailed description describes the preferred embodiment of the present invention, the invention is susceptible to modification, variation, and alteration without deviating from the scope and fair meaning of the subjoined claims.

We claim:

1. A removable chuck comprising:
a sleeve for connecting with a rotating spindle;
a chuck coupled with said sleeve;
a locking mechanism coupled with said sleeve for retaining said sleeve on the rotating spindle, said locking mechanism comprising a locking member for seating in a recess in the spindle, a first biasing member for holding said locking member in the recess, said biasing member movable from a first position, applying a force on said locking member for holding the locking member in the spindle recess, to a second position, where said locking member is out of the spindle recess applying a force on said biasing member;
a locking sleeve surrounding said biasing member, said locking sleeve in a first position prohibiting expansion of the biasing member and removal of said locking member from the spindle recess and said locking sleeve in a second position enabling said sleeve to be removed from the spindle.

2. The removable chuck according to claim 1, further comprising a mechanism for maintaining said locking sleeve in said second position enabling said sleeve to be readily replaced on the spindle.

3. The removable chuck according to claim 2, wherein said maintaining mechanism comprising a biasing member, at least one pin coupled with said biasing member and said pin in an aperture in the sleeve for contact with the spindle, and a latch coupled with the locking sleeve wherein in the locking sleeve first position said pin is on the spindle and in said locking sleeve second position, said pin moving further in said opening in turn latching said biasing member with said latch for maintaining said locking sleeve in said second position and upon replacing said sleeve on the spindle, said pin returning said biasing member from said latch enabling said locking sleeve to return to said first position.

4. The removable chuck according to claim 3, wherein a second biasing member is coupled with said locking sleeve for returning said locking sleeve from said second to first position.

5. The removable chuck according to claim 1, wherein said first biasing member is a spring ring.

6. A hand tool comprising:
a hand tool having a rotatable spindle, said spindle including a recess; and
a removable chuck, said removable chuck comprising:
  a sleeve coupled with said rotating spindle;
  a chuck body coupled with said sleeve;
  a locking mechanism coupled with said sleeve for retaining said sleeve on the rotating spindle, said locking mechanism comprising a locking member for seating in a recess in the spindle, a first biasing member for holding said locking member in the recess, said biasing member movable from a first position, applying a force on said locking member for holding the locking member in the spindle recess, to a second position, where said locking member is out of the spindle recess applying a force on said biasing member;
  a locking sleeve surrounding said biasing member, said locking sleeve in a first position prohibiting expansion of the biasing member and removal of said locking member from the spindle recess and said locking sleeve in a second position enabling said sleeve to be removed from the spindle.

7. The removable chuck according to claim 6, further comprising a mechanism for maintaining said locking sleeve in said second position enabling said sleeve to be readily replaced on the spindle.

8. The removable chuck according to claim 7, wherein said maintaining mechanism comprising a biasing member, at least one pin coupled with said biasing member and said pin in an aperture in the sleeve for contact with the spindle, and a latch coupled with the locking sleeve wherein in the locking sleeve first position said pin is on the spindle and in said locking sleeve second position, said pin moving further in said opening in turn latching said biasing member with said latch for maintaining said locking sleeve in said second position and upon replacing said sleeve on the spindle, said pin returning said biasing member from said latch enabling said locking sleeve to return to said first position.

9. The removable chuck according to claim 4, wherein a second biasing member is coupled with said locking sleeve for returning said locking sleeve from said second to first position.

10. The removable chuck according to claim 1, wherein said first biasing member is a spring ring.

11. The hand tool according to claim 6, wherein said spindle includes an aperture for receiving a tool bit.

12. The hand tool according to claim 11, wherein said spindle includes a locking member for retaining said tool bit in said spindle.

13. A removable chuck comprising:
a chuck member, a retention member projecting from said chuck; and
a release member for coupling with a spindle, said release member including a member for automatically locking said retention member upon insertion of said retention member within said release member.

14. The removable chuck according to claim 13, wherein said retention member being a stud projecting from a rear surface of the chuck.

15. The removable chuck according to claim 14, wherein said locking member having an opening for retaining said stud.

16. The removable chuck according to claim 15, wherein said locking member including a flange coupling with said stud.

17. The removable chuck according to claim 16, wherein said release member is rotatable between a first and second position for releasing said stud from said locking member.

18. The removable chuck according to claim 13, wherein said release member including a cut-out for receiving a locking member in the spindle for retaining a tool bit in the spindle.

19. A hand tool comprising:
a hand tool having a rotatable spindle; and
a removable chuck comprising:
  a chuck body with a retention member projecting from said chuck body; and
  a release member coupled with said spindle, said release member including a member for automatically locking said retention member upon insertion of said retention member within said release member.

20. The removable chuck according to claim 19, wherein said retention member being a stud projecting from a rear surface of the chuck body.

21. The removable chuck according to claim 20, wherein said locking member having an opening for retaining said stud.

22. The removable chuck according to claim 21, wherein said locking member including a flange coupling with said stud.

23. The removable chuck according to claim 22, wherein said release member is rotatable between a first and second position for releasing said stud from said locking member.

24. The removable chuck according to claim 19, wherein said release member including a cut-out for receiving a locking member in the spindle for retaining a tool bit in the spindle.

25. The removable chuck according to claim 19, said spindle including an aperture for receiving a tool bit.

26. The removable chuck according to claim 25, wherein a second aperture for receiving a locking means.

27. The removable chuck according to claim 19, wherein a biasing member is coupled with said hand tool and said release member for returning said release member to said first position.

28. A hand tool, comprising:

a hand tool having a rotatable spindle, said spindle having a bore for receiving a tool;

a tool coupled in said bore; and a removable chuck coupled with said spindle such that when said chuck is removed, said tool in said spindle is exposed and said removable chuck automatically couples with said spindle upon insertion of said removable chuck onto said spindle.

29. The hand tool according to claim 28, wherein said removable chuck includes a mechanism for receiving said tool on said spindle.

30. The hand tool according to claim 28, wherein said tool is removable from said spindle.

31. The hand tool according to claim 28, wherein said removable chuck having a mechanism for retaining said chuck on said spindle.

32. A hand-held tool, comprising:

a hand-held tool having a rotatable spindle, said rotatable spindle having a bore adapted to receive a tool; and a removable chuck coupled with said spindle such that when said chuck is removed from said spindle, said spindle adapted to receive a tool and said removable chuck automatically couples with said spindle upon insertion of said removable chuck onto said spindle.

33. The hand-held tool according to claim 32, wherein said removable chuck includes a mechanism for receiving said tool on said spindle.

34. The hand-held tool according to claim 32, wherein said removable chuck having a mechanism for retaining said chuck on said spindle.

35. The hand-held tool according to claim 32, wherein said removable chuck, when positioned on said hand tool, surrounds said spindle and receiving bore.

* * * * *